2,827,469

PRODUCTION OF CYCLOPENTANOPHENANTHRENE COMPOUNDS

Franz Sondheimer and George Rosenkranz, Mexico City, Mexico, assignors to Syntex, S. A., Mexico City, Mexico, a corporation of Mexico No Drawing. Application July 15, 1954
Serial No. 443,706

Claims priority, application Mexico July 17, 1953

9 Claims. (Cl. 260—397.3)

The present invention relates to a novel method for the production of cyclopentanophenanthrene compounds. More particularly, the present invention relates to a method for removing from steroidal $\alpha,\beta$-unsaturated keto compounds, hydroxy groups and/or esterified hydroxy groups in vicinal position to the $\alpha,\beta$-unsaturated keto grouping. The present method is especially applicable to the removal of hydroxy groups and/or esterified hydroxy groups in position C–2 and/or position C–6 of a steroidal $\Delta^4$-3-keto compound.

Although steroidal compounds containing the $\Delta^4$-3-keto grouping and a hydroxyl group vicinal thereto are useful for some purposes, such compounds are produced in many instances as unwanted secondary products; as for example, in the microbiological oxidation of steroids having as a primary aim the production of 11-hydroxy compounds, United States Patent No. 2,602,769. Such by-products are also produced in the oxidation of progesterone to desoxycorticosterone with lead tetracetate wherein there is formed by way of side reaction 2-acetoxy compounds. It is therefore of importance to provide a method for removing from such compounds the 2 and/or 6-hydroxy groups to thereby produce or recover the original starting material or other valuable compounds.

In accordance with the present invention there has been discovered a process for removing in steroidal compounds, hydroxy groups in vicinal ($\alpha$) position relative to a system of conjugated double bonds, such as an $\alpha,\beta$-unsaturated ketone grouping, or more specifically a $\Delta^4$-3-ketone grouping, by treating such steroidal compounds with an alkali metal, preferably lithium, in liquid ammonia.

There has further been discovered in accordance with the present invention a process for removing in steroidal compounds acyloxy groups in vicinal ($\alpha$) position relative to a system of conjugated double bonds, such as an $\alpha,\beta$-unsaturated ketone grouping, or more specifically a $\Delta^4$-3-ketone grouping, by treating such steroidal compounds with zinc in acetic acid.

A portion of the process of the present invention as applied to steroidal $\Delta^4$-3-ketones, may be illustrated by the following equation:

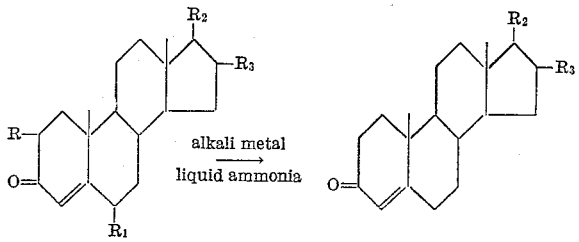

In the above equation R and $R_1$ may represent a hydroxyl group in either the $\alpha$ or $\beta$ configuration; or R may be hydrogen and $R_1$ a hydroxyl group in either the $\alpha$ or $\beta$ configuration; or $R_1$ may be hydrogen and R a hydroxyl group in either the $\alpha$ or $\beta$ configuration.

In the above equation if $R_3$ is hydrogen $R_2$ can be any of the side chains conventionally linked to C–17. For example $R_2$ may be a keto group, a hydroxy group or esterified hydroxy group. $R_2$ may also represent alkyl, alkylene, oxy-alkyl, oxy-alkylene, oxo-alkyl, oxo-alkalylene, carboxy-alkyl, carbalcoxy-alkyl, acetyl, acyloxy-alkyl or acyloxy-acetyl or the dihydroxy acetone side chain. $R_2$ and $R_3$ together can also represent a spiroketal side chain such as that found in the steroidal sapogenins.

In practicing the process above outlined the steroidal $\Delta^4$-3-ketone having a hydroxy group at C–2 and/or C–6 is dissolved in an organic solvent as for example tetrahydrofurane and slowly added to a solution of alkali-metal, preferably lithium, in liquid ammonia.

A second portion of the present invention is illustrated by the following equation:

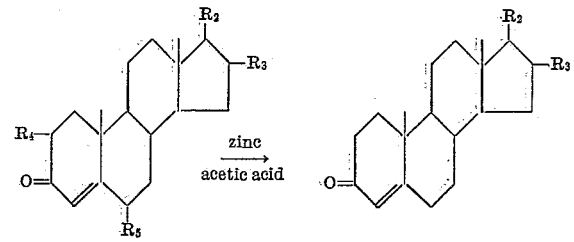

In the above equation $R_4$ and $R_5$ represent an acyloxy group in either the $\alpha$ or $\beta$ configuration; or $R_4$ may represent hydrogen and $R_5$ an acyloxy group in either the $\alpha$ or $\beta$ configuration; or $R_5$ may be hydrogen and $R_4$ may represent an acyloxy group in either the $\alpha$ or $\beta$ configuration. $R_2$ and $R_3$ represent the same groups as hereinbefore set forth. It may be noted that in the above set forth reaction with zinc in acetic acid, especially good yields are obtained when the acyloxy group at C–2 is in $\beta$ configuration and while the reaction is effective on a C–2 $\alpha$-acyloxy group the yields are rather low. On the other hand the removal of acyloxy groups at C–6 proceeds in good yield irrespective of the steric configuration. It may be noted further that the acyloxy groups are preferably those derived from lower fatty acids.

In practicing the process just outlined the acyloxy substituted steroid of the character set forth above is preferably dissolved in glacial acetic acid containing a small amount of water and zinc dust added thereto. The mixture is then stirred at room temperature for a period of the order of 10 minutes to 2 hours. Purification of the resultant product gave the corresponding steroid devoid of the C–2 or C–6 acyloxy group.

The following specific examples serve to illustrate but are not intended to limit the present invention:

Example I 1 g. of zinc dust was mixed with 500 mg. of the diacetate of $\Delta^4$-androstene-2$\beta$,17$\beta$-diol-3-one (see the United States Patent No. 2,602,803 of Kaufmann, Rosenkranz and Berlin) dissolved in 10 cc. of acetic acid and 3 cc. of water. The mixture was stirred for 10 minutes at room temperature and filtered and the filtrate was diluted with water and extracted with chloroform. The combined extracts were washed with sodium bicarbonate solution, dried over sodium sulfate and evaporated to dryness. Recrystallization of the residue from acetone-hexane yielded 305 mg. of testosterone acetate with melting point 139–141° C., identical to an authentic sample.

Example II 1 g. of zinc dust was mixed with 500 mg. of the diacetate of $\Delta^4$-androstene-2$\alpha$,17$\beta$-diol-3-one dissolved in 10 cc. of acetic acid and 3 cc. of water. After treating the mixture as described in Example I, there was obtained, after recrystallization from acetone-hexane, 230 mg. of unaltered starting material. The mother liquors were chromatographed in a column of activated alumina, thus giving 15 mg. of testosterone acetate.

*Example III*

1 g. of zinc dust was mixed with 500 mg. of 6β-acetoxy-progesterone dissolved in 10 cc. of acetic acid and 3 cc. of water, and the mixture was stirred for 2 hours at room temperature. Working up the mixture in accordance with the method described in Example I afforded 220 mg. of progesterone having a melting point of 127–129° C., identical to an authentic sample.

*Example IV*

A solution of 1 g. of 6β-hydroxy-testosterone ($\Delta^4$-androstene-6β,17β-diol-3-one) in 30 cc. of tetrahydrofurane was added dropwise to a stirred solution of 500 mg. of lithium metal in 200 cc. of liquid ammonia. The stirring was continued for 15 minutes further, 5 cc. of t-butanol was added and the stirring was continued until complete disappearance of the blue color. After evaporation to dryness, the residue was crystallized from acetone-pentane, thus giving 430 mg. of testosterone with melting point 152–153° C.

We claim:

1. A process for treating a steroidal compound selected from the group consisting of androstene and pregnene compounds having an α,β-unsaturated keto grouping and a lower fatty acid acyloxy group vicinal thereto to remove the acyloxy group which comprises reacting the steroidal compound with zinc in acetic acid.

2. The process of claim 1 wherein the steroidal compound having an α,β-unsaturated keto grouping is a $\Delta^4$-3-ketone.

3. The process of claim 1 wherein the steroidal compound having an α,β-unsaturated keto grouping and an acyloxy group vicinal thereto is a steroidal 2-acyloxy-$\Delta^4$-3-ketone.

4. The process of claim 1 wherein the steroidal compound having an α,β-unsaturated keto grouping and an acyloxy group vicinal thereto is a steroidal 6-acyloxy-$\Delta^4$-3-ketone.

5. A process for the production of testosterone from a 2-acetoxy-testosterone which comprises treating a compound selected from the group consisting of 2-acetoxy-testosterone and its acetate with zinc in acetic acid.

6. A process for the production of testosterone from 2β-acetoxy-testosterone which comprises treating the 2β-acetoxy-testosterone with zinc in acetic acid.

7. A process for the production of progesterone which comprises reacting a 6-acetoxy-progesterone with zinc in acetic acid.

8. A process for the production of progesterone which comprises reacting 6β-acetoxy-progesterone with zinc in acetic acid.

9. A process for the production of testosterone from 2β-acetoxy-testosterone acetate which comprises treating the 2β-acetoxy-testosterone acetate with zinc in acetic acid.

References Cited in the file of this patent

UNITED STATES PATENTS

| 2,229,813 | Miescher | Jan. 28, 1941 |
| 2,366,204 | Marker | Jan. 2, 1945 |
| 2,420,491 | Marker | May 13, 1947 |

FOREIGN PATENTS

| 212,336 | Switzerland | Mar. 3, 1941 |